United States Patent [19]

Jobe

[11] B 3,913,385

[45] Oct. 21, 1975

[54] MONITOR FOR DETECTING SURFACTANTS IN LIQUID PETROLEUM PRODUCTS

[75] Inventor: John D. Jobe, Deer Park, Tex. 77536

[73] Assignee: Shell Oil Company, Houston, Tex.

[22] Filed: Apr. 16, 1973

[21] Appl. No.: 351,735

[44] Published under the Trial Voluntary Protest Program on January 28, 1975 as document no. B 351,735.

[52] U.S. Cl. ............................... 73/61.1 R; 73/64.4
[51] Int. Cl.² ......................................... G01N 13/02
[58] Field of Search ................. 73/64.4, 61.1 R, 53; 222/420

[56] References Cited
UNITED STATES PATENTS
2,473,553    6/1949    Stokes................................. 73/64.4

OTHER PUBLICATIONS

Kippenhan, C. et al., A Bubble Growth Experiment for the Determination of Dynamic Surface Tension, In AIChE Jour. 16(2): pp. 314–316, Mar. 1970.

Primary Examiner—Donald O. Woodiel
Assistant Examiner—Joseph W. Roskos

[57] ABSTRACT

A monitoring apparatus for automatically detecting the presence of a surface active agent in a liquid hydrocarbon wherein the time required for a constant volume of a liquid caustic to drop from the end of a probe extending into the hydrocarbon is measured. The drop time can be correlated with the quantity of the surface active agent in the liquid hydrocarbon.

11 Claims, 3 Drawing Figures

MONITOR FOR DETECTING SURFACTANTS IN LIQUID PETROLEUM PRODUCTS

BACKGROUND OF THE INVENTION

The present invention relates to a monitor for detecting the presence of surface active agents or surfactants in liquid petroleum products. During many operations in the manufacting distribution of petroleum products, it is desirable to known if surfactants are present and, if possible, the quantity. For example, in the marketing of jet turbine fuel, it is necessary to maintain the water content at an extremely low level, i.e., less than 100 parts per million. In order to meet this specification, filters are used for removing the water from the jet fuel. The filters are normally the coalescent type wherein the water attaches to the filter material. While the filters will remove the water, the presence of even minor amounts of surfactants for example, less than 1 part per million, will seriously impair the efficiency of the filter. The surfactants increase the tendency of the water to bypass the filter elements and remain suspended in the jet fuel. In order to solve the problem of surfactants in the jet fuel, clay filters are used to remove the surfactants so that they do not impair the efficiency of the final filters. While the clay filters will remove the sufactants, they do become saturated and it is necessary to regenerate or replace them. For efficient operation of the filtering system some means must be provided for the ready detection of the presence of any surfactants in the fuel leaving the clay filters. In the absence of a means for detecting surfactants one must change filters on a time cycle which may allow fuel containing surfactants to flow through a saturated filter.

In addition to the above need, it is also desirable to know whether surfactants are present in various refinery streams that are used for blending gasoline and other products. For example, the alkalate stream in a refinery as well as a catalytic cracked gasoline stream tend to pick up surfactants in the refinery processes. surfactants cause dispersion of water and particulate matter in hydrocarbons and lead to poor product cleanliness. Thus it is desirable to know if surfactants are present in these streams prior to their blending with other products.

Further, it is possible to determine the quantity of detergent additives in gasoline by monitoring the gasolines for the presence of surfactants. Since most detergents are surfactant type materials, obviously any monitor for surfactants will also monitor gasolines for detergent additives.

There exists a manual test for surfactants in liquid petroleum products. In this test, a measured or metered quantity of an aqueous test solution, for example, a sodium hydroxide caustic solution, is discharged from and remains attached to the end of a small diameter probe or capillary tube which is immersed in the hydrocarbon sample. The time required for the resulting drop of aqueous test solution to separate from the end of the probe is measured and used as an indication of the amount of surfactant in the material. Acid or pure water test solutions have also been used with various degrees of success. While this test is satisfactory as a laboratory tool, it has several disadvantages when used in routine analysis. For example, it requires an operator to inject the metered amount of caustic into the probe and time the fall of the drop. Also, the repeatability of the test is poor and the results vary considerably although the material being tested has a substantially uniform composition. Thus the test has remained a laboratory tool and it has not been used successfully in routine analysis or as a process monitor.

BRIEF SUMMARY OF THE INVENTION

The present invention solves the above problems by automating the former manual test and improving the apparatus so that the results are repeatable. Additionally, the present invention allows the test to be performed in a flowing stream. More particularly, the present apparatus uses a sample cell provided with a means for supplying a continuous flow of the liquid hydrocarbon sample thereto. A probe member extends into the cell while a means is provided for detecting the separation of the drop of caustic from the end of the probe member. Further, the probe member is preferably coated or provided with a surface which does not react chemically with the caustic or acid test solution. For example, the probe may be coated with a tetrafluoroethylene resin sold under the trade name Teflon.

A metering means is coupled to the probe to supply metered quantities of caustic to the probe. For example, a small positive displacement pump supplying a fixed quantity of material for each stroke of the pump can be used. The control circuit for the pump is preferably digital so that the metered quantity may be varied in precise increments. For example, a programmable digital counter may be used for selecting a preset number of pump strokes with the pump cycle being initiated by the detaching of the drop from the probe. The time measuring circuit is started upon the completion of the pump cycle and terminated by the detection of the detaching of the drop. The digital circuit also improves the accuracy of the system since it provides substantially uniform metered quantities of the caustic solution as well as accurate timing of the passage of the drop. Further, the utilization of the passage of the drop to initiate the pump cycle insures the system will operate on a substantially continuous cycle.

BRIEF DESCRIPTION OF THE DRAWINGS

The present invention will be more easily understood from the following description when taken in conjunction with the attached drawings in which.

DESCRIPTION OF THE PREFERRED EMBODIMENT

Figure 1:
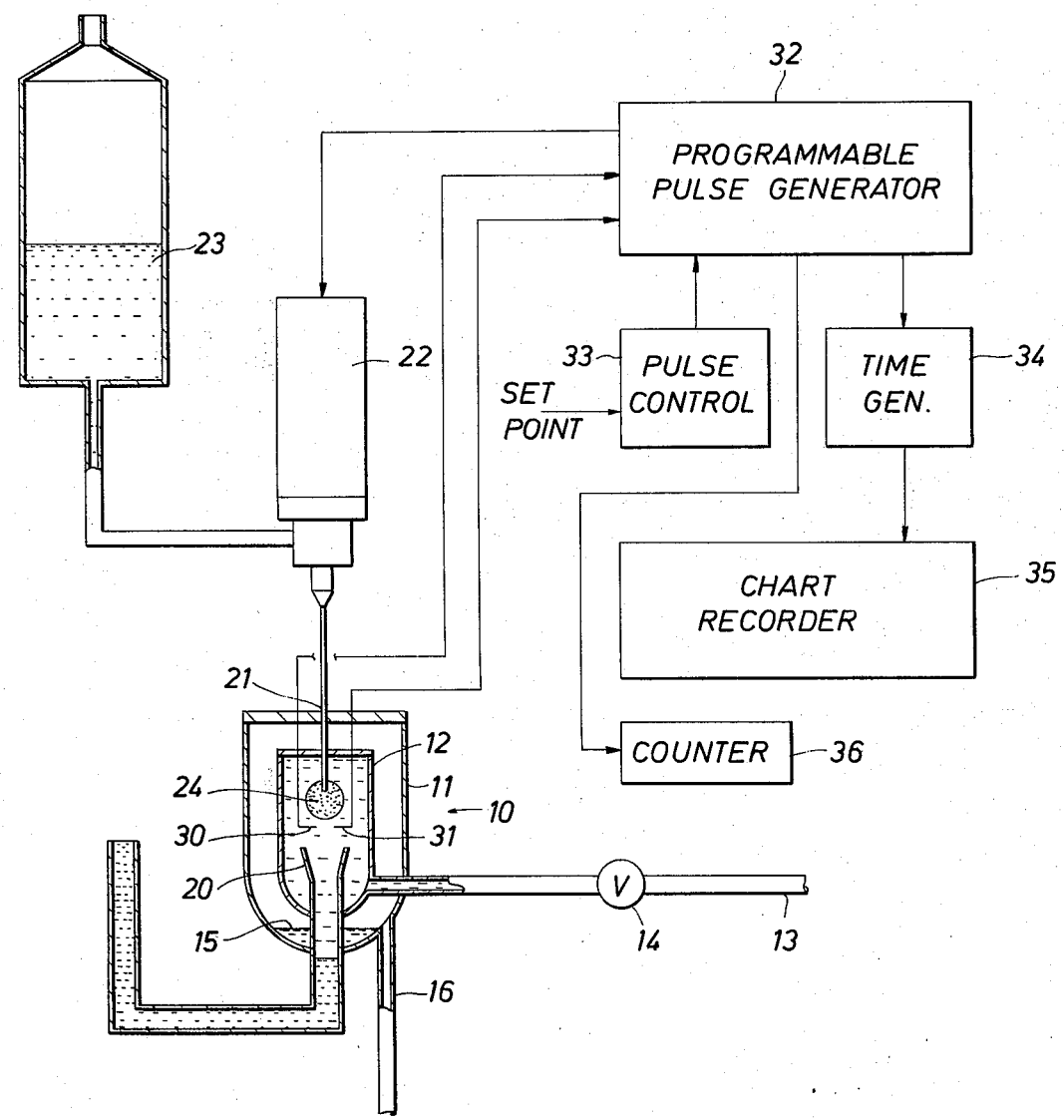
FIG. 1 is a schematic drawing of the complete system with the major components showing in block diagram form.

Referring now to FIG. 1 there is shown an instrument constructed according to the present invention. More particularly, there is shown a sample cell 10 having an outer container 11 and an inner container 12. The liquid hydrocarbon to be monitored is supplied through a conduit 13 to the inner cell 12 with a valve or flow regulating device 14 being provided to control the flow of the hydrocarbon at some constant rate. The hydrocarbon flows into the bottom of inner container 12 and overflows at the top to provide a constant volume of fresh liquid hydrocarbon. The hydrocarbon overflowing the top of the inner container 12 collects in the bottom 15 of the outer container where it is drained by means of a drain line 16.

A drain conduit 20 is mounted concentrically within the inner container 12 and is used to collect the caustic or other aqueous test solution dropping from the bottom of the probe 21. The caustic solution drain conduit should have its upper end above the bottom of the inner sample container 12 so that it does not drain the inner container.

The probe 21 extends into the inner container with its lower end below the surface of the liqiud. The probe 21 can be made from a conventional square-ended hypodermic needle coated with an inert material, for example, tetrafluoroethylene resin commonly known as Teflon may be used as a coating. The hypodermic needle is connected to the discharge of the metering pump 22. The metering pump 22 may be a conventional positive displacement pump such as the Model 1402 manufactured by the Harvard Apparatus Company of Millis, Mass. This pump discharges a ten microliter volume for each stroke of the pump. The pump is solenoid operated so that by controlling the number of pulses supplied to the solenoid one can control the quantity of material discharged by the pump. The pump suction is coupled to a reservoir 23 containing the aqueous test liquid or caustic. This reservoir must be formed of or coated with an inert material and glass reservoirs are not suitable. As explained, one normal solution of soduim hydroxide is a satisfactory test liquid for many applications. The caustic supplied by the pump forms a drop 24 at the bottom of the probe and the time required for the drop to become detached from the end of the probe is a monotonic decreasing function of the quantity of surfactant in the liquid hydrocarbon sample.

The detaching or falling of the drop from the end of the probe is detected by a pair of electodes 30 and 31 disposed adjacent to the path of the drop. When the drop passes between the two electrodes it will materially change the resistance between the two electrodes and will signal the falling of the drop. The electrodes are coupled to a programmable pulse generator 32 which supplies the desired number of pulses for operating the pump 22. The number of pulses supplied by the pulse generator is controlled by the set point of the pulse control circuit 33 while the time required for the drop to fall from the end of the probe is measured by a time generator 34. More particularly, the number of pump strokes desired is manually set in the pulse control circuit 33. The completion of the last pump stroke is used to initiate the starting of time generator 34. The signal detected by the electrodes for the falling of the drop is used to terminate the operation of the time generator 34 with the elapsed time being recorded on the chart recorder 35. The total number of drops detached is displayed on a counter 36 in order that the operation of the system may occasionally be checked. The total number of drops detached correlates with the total amount of surfactant encountered over a certain period of time.

From the above discussion it is seen that a simple automatic monitor has been provided for continuously monitoring a liquid hydrocarbon stream for the presence of surfactants, more particularly, a small sample stream 13 is provided from the main hydrocarbon stream with the sample continuously flowing through the sample cell 10. The system intermittently supplies a metered quantity of the test liquid or caustic solution to the bottom of the probe member 21. The time required for this metered amount of text liquid to fall in the form of a drop from the end of the probe is accurately measured by the associated circuitry. Further, the portions of the system which come in contact with the test liquid or caustic solution are coated or formed of a material which is inert to the caustic. This is an important feature since many materials will react with test solutions of caustic or acid nature to form compounds which in themselves are surfactants. For example, silicates leached from glass adversely affect the test. The presence of these surfactants destroy the accuracy and the repeatability of the monitor.

Figure 2:
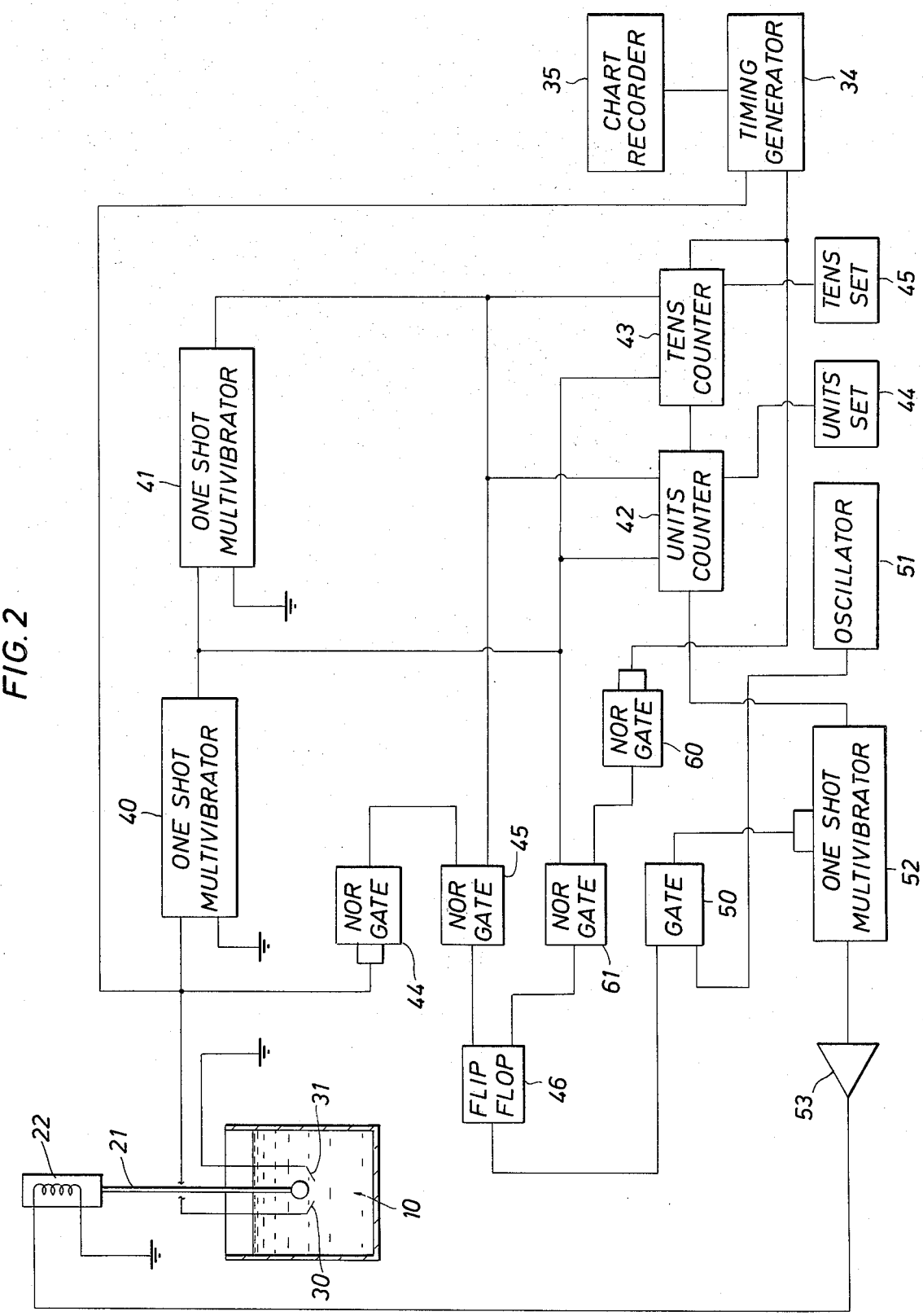

Referring now to FIG. 2 there is shown in block diagram form the circuit for controlling the operation of the monitor. More particularly, the signal from the electrodes is supplied to a one-shot multivibrator 40 whose output signal is supplied to both a second one-shot multivibrator 41 as well as a NOR gate 61. The signal from the second multivibrator is supplied to a second NOR gate 45 and to both the units counter 42 and the tens counter 43. The signal from the electrodes is also supplied to both inputs for NOR gate 44 with the output of the NOR gate 44 being supplied to one input of the NOR 45. Thus the NOR gate 45 will open when it receives both the signal from the electrodes and the signal from the one-shot multivibrator 41. The signal from NOR gate 45 is coupled to the flip-flop 46 to position it in its other or second stable condition and supply a signal to open the gate 50. When the gate 50 opens, it will transmit pulses from the oscillator 51 to the one-shot multivibrator 52 that transmits an output signal for each pulse received from the oscillator 51. This series of pulses will be supplied both to the power amplifier 53 and the units and tens counters 42 and 43. The power amplifier will supply an output signal for operating the solenoid of the pump 22. The units and tens counters will count pulses received from the oscillator until the units and tens counters reach the position for which they have been preset. When the counters reach their preset numbers, they will transmit a signal to both inputs of the NOR gate 60, which will in turn transmit a signal to the NOR gate 61 to open NOR gate 61. The NOR gate 61 supplies a signal to the other input of the flip-flop 46 to return it to its original condition. This will remove the pulse from the gate 50 and close the gate. Thus the circuit will transmit the pulses that have been preset on the unit and tens counters to actuate the pump 22. The counters, in addition to closing the gate 50, also initiate the operation of the timing generator 34 while the signal from electrodes 30 and 31 is used to stop the timing generator. This will permit the timing generator to measure the elapsed time from the formation of the drop by the action of the pump until the drop passes between the electrodes. Thus the timing generator will measure the time interval that elapses between the formation of the drop and the falling of the drop from the end of the probe which time interval can be recorded on the recorder 35. The system also includes a units setting mechanism 44 and a tens setting mechanism 45. These two mechanisms permit setting of the units counter 42 and the tens counter 43, respectively, to obtain desired number of strokes of the pump 22. The two units together correspond to the pulse control circuit 33 shown in FIG. 1.

In a sample cell containing approximately 15 cubic centimeters of hydrocarbon sample with a density of approximately 0.8 grams per cc flowing at a rate of approximately 10 cubic centimeters per minute, a drop volume of 80 microliters has been found satisfactory to form a suitable size drop when using a hypodermic needle having an outside diameter of 0.73 inches. Since the pump discharges a 10 microliter sample for each stroke, this means that eight strokes of the pump will be required. The oscillator 51 may have a frequency between 0.1 Hertz and 10 Hertz and normally is set for approximately 0.6 Hertz frequency. Thus the complete drop of the test liquid will be formed in approximately 5 seconds. For normal clean hydrotreated commercial jet turbine fuel, the drop time can be in the range of 600 to 5,000 seconds. In contrast, fuel having as little as 2 parts per million of a surfactant such as dodecylbenzene sulfonic acid will have a drop time of approximately 100 seconds. For samples of gasolines, a drop size of 50 microliters has been found satisfactory.

From the above, it is seen that the monitor can be used as a process control instrument to control the operation of the adsorbent filters used in a jet turbine fuel treating installation. For example, it would be possible to set the monitor so that when a drop time of 100 seconds is reached, the fuel is switched to a standby filter while the previous filter is regenerated or replaced by known methods. Similarly, the monitor could be used to control process variables in refineries wherein the presence of a surfactant indicates an upset or other malfunction in the process. Additionally, the monitor can be used to monitor or control the addition of detergent additives to hydrocarbon fuels such as gasolines.

Figure 3:
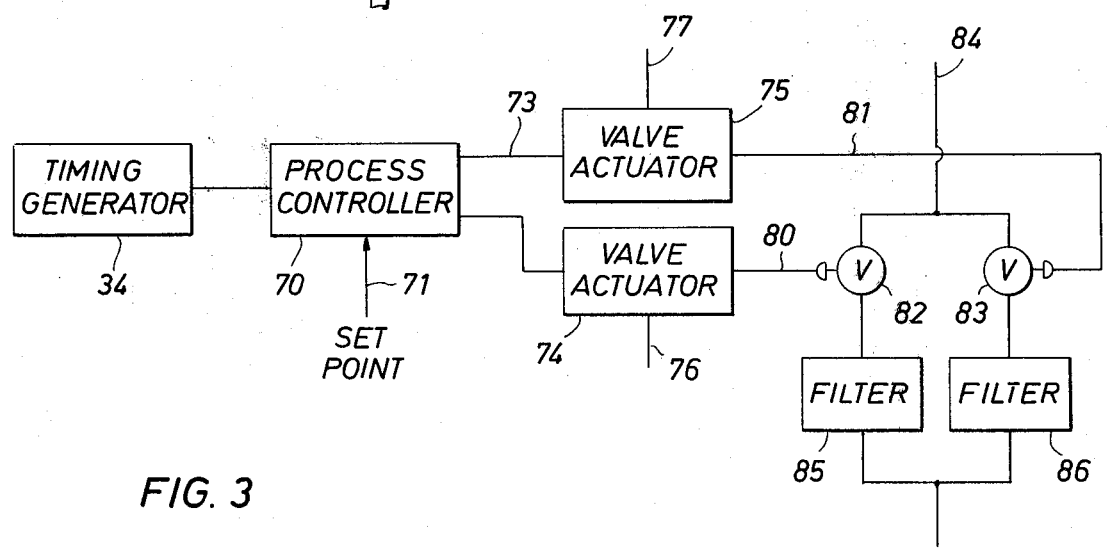
FIG. 2 is a schematic drawing of the control system used for controlling the pump as well as measuring the time required for the drop to fall and FIG. 3 is a block diagram showing the use of the system shown in FIG. 2 to control the operation of a filtering process.

A process control system is shown in FIG. 3 wherein the signal from the timing generator 34 shown in FIG. 2 is used as the control signal. The signal from the timing generator is supplied to an analog process controller 70 having a set point 71. The set point corresponds to the minimum acceptable drop time. When the actual drop time falls below the set point, the controller will shift the filters 85 and 86. The controller of course must include proportional and derivative actions and a circuit to select the proper output terminal 72 or 73. The selecting circuit may be a pair of relays and a flip-flop circuit so that whenever an output signal appears in the controller it is used to shift the fuel flow to the standby filter.

The terminals 72 and 73 are coupled to valve actuators 74 and 75 that are supplied with a power source 76 and 77. The power source may be compressed air and the actuators utilize the electrical signal to supply the power source or compressed air to the proper valve. The actuators 74 and 75 supply power source over leads 80 and 81 to valves 82 and 83 that control the flow through filters 85 and 86. The fuel flow in line 84 can be shifted between the filters in response to the surfactants in the fuel. When the fuel flows through one filter the other filter can be regenerated or replaced.

While the above description relates to the filtering of fuel to remove surfactants the monitor could be used to control other processes in response to the surfactants present. Since the timing generator supplies an analog output signal it may be coupled directly to an analog process controller.

I claim as my invention:

1. A monitor for continuously monitoring a liquid hydrocarbon for the presence and/or amount of a surfactant, said monitor comprising:
   a sample cell;
   flow means communicating with said sample cell for supplying a continuous sample of said liquid hydrocarbon to said sample cell at a constant rate;
   a tubular probe member, said probe member being mounted so that the lower end of the probe extends below the surface of the liquid in said sample cell;
   a source of test liquid;
   a metering means, said metering means being coupled to said probe to supply a metered quantity of a test liquid from said source to said probe;
   a detecting means disposed in said sample cell to detect when the metered quantity of test liquid drops from the lower end of said probe; and
   measuring means coupled to said metering means and said detecting means and disposed to measure the elapsed time between the supplying of the metered quantity of test liquid to the probe and the dropping of the metered quantity from the lower end of the probe.

2. The monitor of claim 1 wherein the surfaces of said metering means and said probe in contact with said test liquid are formed of a meterial that does not react with said test liquid.

3. The monitor of claim 1 and in addition a programming means coupled to said measuring means and said metering means to control the supplying of a sample to said probe means.

4. The monitor of claim 3 wherein said program means includes means for varying the size of said metered quantity of test liquid.

5. The monitor of claim 1 wherein said metering means is a piston pump having a fixed stroke.

6. The monitor of claim 5 wherein the number of strokes of said pump are varied to vary the size of said metered quantity.

7. The monitor of claim 1 wherein said detecting means comprises a pair of electrodes disposed on opposite sides of the lower end of said probe.

8. A system for controlling a variable in a process having a flowing liquid stream in response to the surfactant present in the liquid, said system comprising:
   a sample cell including means for supplying a continuous sample of said liquid to said sample cell at a metered rate;
   a tubular probe member having one end extending into said sample cell and disposed to periodically discharge a metered amount of test liquid into said sample cell;
   measuring means disposed to detect the time required for said metered amount of test liquid to drop from the end of said probe that extends into the sample cell, said measuring means supplying an output signal related to said detected time; and
   a process controller coupled to said measuring means and disposed to control said process variable.

9. The system of claim 8 wherein a metering means is coupled to said tubular probe and disposed to periodically supply a metered amount of test liquid to said probe.

10. The system of claim 9 wherein said metering means comprises a piston pump that discharges a constant volume for each stroke.

11. The system of claim 8 wherein said process comprises a filtering process having at least two filters with a single filter being used and said variable comprises the ability of the filter in use to remove surfactant, said process controller being coupled to an actuating means for shifting from the filter in use to a stand-by filter when the amount of surfactant exceeds a pre-set level.

* * * * *